United States Patent
Han et al.

(10) Patent No.: US 12,267,889 B2
(45) Date of Patent: Apr. 1, 2025

(54) SERVICE PROCESSING METHOD, APPARATUS, AND SYSTEM

(71) Applicant: Huawei Technologies Co., Ltd., Shenzhen (CN)

(72) Inventors: Wenyong Han, Shenzhen (CN); Chunsheng Xie, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 318 days.

(21) Appl. No.: 17/852,813

(22) Filed: Jun. 29, 2022

(65) Prior Publication Data

US 2022/0330355 A1    Oct. 13, 2022

Related U.S. Application Data

(63) Continuation of application No. PCT/CN2020/140182, filed on Dec. 28, 2020.

(30) Foreign Application Priority Data

Dec. 30, 2019  (CN) .......................... 201911393673.7

(51) Int. Cl.
*H04W 76/10* (2018.01)
*H04L 12/46* (2006.01)
(Continued)

(52) U.S. Cl.
CPC ......... *H04W 76/11* (2018.02); *H04L 12/4641* (2013.01); *H04W 8/20* (2013.01); *H04W 80/10* (2013.01)

(58) Field of Classification Search
CPC ............. H04L 12/4633; H04L 12/4641; H04L 65/1073; H04L 67/10; H04L 67/141;
(Continued)

(56) References Cited

U.S. PATENT DOCUMENTS 11,432,349 B2*  8/2022  Yao .................... H04L 41/0895
11,743,970 B2*  8/2023  Wang .................... H04W 8/186
                                                                        455/518
(Continued)

FOREIGN PATENT DOCUMENTS

CN    109314887 A    2/2019
WO    2018144697 A1  8/2018

OTHER PUBLICATIONS

3GPP TS 23.501 V16.3.0, Dec. 2019, "3rd Generation Partnership Project; Technical Specification Group Services and System Aspects; System architecture for the 5G System (5GS); Stage 2 (Release 16)," 417 pages.

(Continued)

*Primary Examiner* — Frank Duong
(74) *Attorney, Agent, or Firm* — Conley Rose, P.C.

(57) ABSTRACT

In a service processing method, a capability exposure network element receives a first message from an application function network element, where the first message carries a terminal identifier and first network information of a first virtual network, the first network information includes a first virtual network identifier, and the first message is used to request to add a terminal corresponding to the terminal identifier to the first virtual network corresponding to the first virtual network identifier; and the capability exposure network element determines, based on the first network information, a first service management device serving the first virtual network, and sends a second message to the first service management device, where the second message carries the terminal identifier and the first network information, and the second message is used to request to add the terminal to the first virtual network.

20 Claims, 9 Drawing Sheets

(51) Int. Cl.
  *H04W 8/20* (2009.01)
  *H04W 76/11* (2018.01)
  *H04W 80/10* (2009.01)
(58) Field of Classification Search
  CPC ....... H04L 67/142; H04L 67/51; H04L 67/55; H04W 4/08; H04W 8/18; H04W 8/20; H04W 76/10; H04W 76/11; H04W 80/10; H04W 88/18
  See application file for complete search history.

(56) References Cited

U.S. PATENT DOCUMENTS

| | | | | |
|---|---|---|---|---|
| 11,812,496 | B2* | 11/2023 | Wang | H04L 65/403 |
| 12,015,503 | B2* | 6/2024 | Yao | H04W 4/08 |
| 2017/0332421 | A1 | 11/2017 | Sternberg et al. | |
| 2018/0192390 | A1 | 7/2018 | Li et al. | |
| 2019/0261260 | A1 | 8/2019 | Dao et al. | |
| 2019/0313468 | A1* | 10/2019 | Talebi Fard | H04W 60/04 |
| 2020/0228936 | A1* | 7/2020 | Talebi Fard | H04W 8/186 |

OTHER PUBLICATIONS

3GPP TR 23.734 V16.2.0, Jun. 2019, Technical Report3rd Generation Partnership Project;Technical Specification Group Services and System Aspects; Study on enhancement of 5G System (5GS) for vertical and Local Area Network (LAN) services (Release 16), 117 pages.

SA2, "Reply LS on 5G service request procedure," 3GPP TSG SA WG2 Meeting #125, S2-181016, WAS S2-180943, Jan. 22-26, 2018, Gothenburg, Sweden, 1 page.

Samsung, "5G LAN Group Management Procedure," 3GPP TSG SA WG2 Meeting #130, S2-1900242, Jan. 21-25, 2019, Kochi, India, 3 pages.

* cited by examiner

SERVICE PROCESSING METHOD, APPARATUS, AND SYSTEM

CROSS-REFERENCE TO RELATED APPLICATIONS

This is a continuation of International Patent Application No. PCT/CN2020/140182 filed on Dec. 28, 2020, which claims priority to Chinese Patent Application No. 201911393673.7 filed on Dec. 30, 2019. The disclosures of the aforementioned applications are hereby incorporated by reference in their entireties.

TECHNICAL FIELD

This application relates to the field of communications technologies, and in particular, to a service processing method, apparatus, and system.

BACKGROUND

In a 5th generation (5G) communications system, a 5G local area network (5GLAN), also referred to as a 5G virtual network (5GVN), is a service of a 5G network defined by the 3rd Generation Partnership Project (3GPP), and is mainly used in home communication, enterprise office, factory manufacturing, internet of vehicles, power grid reconstruction, public security agencies, and the like. The 5GVN service can provide private communication of an Internet Protocol (IP) type or a non-IP type (for example, an Ethernet type) for two or more terminals in a group. For example, office devices of employees in a department of an enterprise may form a group. Office devices in the group communicate with each other, and office devices that are not in the group cannot communicate with each other.

For the SGLAN service, the 3GPP proposes to support one-to-one and one-to-many communication in the SGLAN. Further, to support one-to-one communication and one-to-many communication in the SGLAN, a 3GPP network is required to support group-based unicast, multicast, and broadcast, support duplication and distribution of multicast and broadcast packets, and support any terminal as a multicast source.

It is defined in current 3GPP 23.501 that one 5GVN is managed by only one session management function (SMF) network element, and the SMF network element manages one or more user plane function (UPF) network elements. A service logic between all SMF network elements in a 5GVN is coordinated or managed by a group service management function (GSMF) network element.

However, in actual networking, there may be more than one GSMF network element in a network. In this case, a service processing problem in a network having a plurality of GSMF network elements needs to be resolved.

SUMMARY

Embodiments of this application provide a service processing method, apparatus, and system, to resolve a service processing problem in a network with a plurality of service management devices.

To achieve the foregoing objective, embodiments of the present disclosure provide the following technical solutions.

According to a first aspect, a service processing method is provided. A capability exposure network element receives a first message from an application function network element, where the first message carries a terminal identifier and first network information of a first virtual network, the first network information includes a first virtual network identifier, and the first message is used to request to add a terminal corresponding to the terminal identifier to the first virtual network corresponding to the first virtual network identifier, the capability exposure network element determines, based on the first network information, a first service management device serving the first virtual network, and then the capability exposure network element sends a second message to the first service management device, where the second message carries the terminal identifier and the first network information, and the second message is used to request to add the terminal to the first virtual network such that a correspondence between the terminal identifier and the first network information is stored. According to this disclosure, in a network with a plurality of service management devices, the capability exposure network element can also address the first service management device serving the terminal, to implement a service of adding the terminal to the virtual network.

In an implementation, the capability exposure network element sends the first network information to a network repository function network element, and the capability exposure network element receives, from the network repository function network element, identification information that is of the first service management device and that corresponds to the first network information. In this way, the capability exposure network element addresses the first service management device serving the terminal.

In an implementation, the first virtual network identifier includes identification information of the first service management device, and correspondingly, the capability exposure network element obtains the identification information of the first service management device from the first virtual network identifier. In this way, the capability exposure network element addresses the first service management device serving the terminal.

In an implementation, the first service management device sends the first network information and the terminal identifier to a user data repository such that the user data repository stores the correspondence between the first network information and the terminal identifier.

In an implementation, the first service management device sends, to a subscriber data management device, a third message used to modify subscription, where the third message carries the terminal identifier and the first virtual network identifier such that the subscriber data management device adds the first virtual network identifier to subscription data of the terminal corresponding to the terminal identifier.

In an implementation, the first service management device sends a first data network name, a first single-network slice selection assistance information, and the first virtual network identifier to the user data repository such that the user data repository stores a correspondence between the first data network name, the first single-network slice selection assistance information, and the first virtual network identifier.

According to a second aspect, this application provides another service processing method that includes a session management network element that receives a session setup request message from a terminal, where the session setup request message carries a terminal identifier of the terminal, the session management network element obtains a first virtual network identifier of a first virtual network on which the terminal is located from a subscriber data management device, the session management network element determines, based on the first virtual network identifier, a first service management device serving the first virtual network, and the session management network element sends a notification message to the first service management device, where the notification message carries the terminal identifier and the first virtual network identifier and is used to notify the first service management device that the terminal joins the first virtual network. According to this disclosure, in a network with a plurality of service management devices, the session management network element can also address the first service management device serving the terminal, to notify the first service management device that the terminal is online.

In an implementation, that the session management network element determines, based on the first virtual network identifier, a first service management device serving the first virtual network includes that the session management network element sends first network information of the first virtual network to a network repository function network element, where the first network information includes the first virtual network identifier, and the session management network element receives, from the network repository function network element, identification information that is of the first service management device and that corresponds to the first network information.

In an implementation, that the session management network element determines, based on the first virtual network identifier, a first service management device serving the first virtual network includes that the session management network element obtains identification information of the first service management device from the first virtual network identifier.

In the embodiment provided in the first aspect or the second aspect, in an implementation, the network repository function network element receives a registration message from the first service management device, where the registration message carries the identifier of the first service management device and network information of at least one virtual network served by the first service management device, network information of each of the at least one virtual network includes an identifier of the virtual network, and the at least one virtual network includes the first virtual network, and the network repository function network element stores a correspondence between the identification information of the first service management device and the network information of the at least one virtual network. In this way, the network repository function network element can subsequently provide a service management device addressing function for the outside.

In the method provided in the first aspect or the second aspect, in an implementation, the first network information further includes the first data network name and the first single-network slice selection assistance information.

In the method provided in the first aspect or the second aspect, in an implementation, the capability exposure network element receives a virtual network adding request message from the application function network element, where the virtual network adding request message carries the first data network name and the first single-network slice selection assistance information, the capability exposure network element sends the first data network name and the first single-network slice selection assistance information to the network repository function network element, the capability exposure network element receives, from the network repository function network element, information about at least one service management device corresponding to the first data network name and the first single-network slice selection assistance information, where the at least one service management device includes the first service management device, the capability exposure network element sends the first data network name and the first single-network slice selection assistance information to the first service management device, the capability exposure network element receives the first virtual network identifier that is allocated by the first service management device and that corresponds to the first data network name and the first single-network slice selection assistance information, and the capability exposure network element sends a virtual network adding response message that carries the first virtual network identifier to the application function network element.

According to a third aspect, a communications apparatus is provided to implement the foregoing methods. The communications apparatus may be the capability exposure network element in the first aspect, or an apparatus including the capability exposure network element. Alternatively, the communications apparatus may be the session management network element in the second aspect, or an apparatus including the session management network element. The communications apparatus includes a corresponding module, unit, or means for implementing the foregoing methods. The module, unit, or means may be implemented by hardware or software, or implemented by hardware executing corresponding software. The hardware or the software includes one or more modules or units corresponding to the foregoing functions.

According to a fourth aspect, a communications apparatus is provided. The apparatus includes a processor and a memory. The memory is configured to store computer instructions. When the processor executes the instructions, the communications apparatus is enabled to perform the method according to any one of the foregoing aspects. The communications apparatus may be the capability exposure network element in the first aspect, or an apparatus including the capability exposure network element. Alternatively, the communications apparatus may be the session management network element in the second aspect, or an apparatus including the session management network element.

According to a fifth aspect, a communications apparatus is provided, and includes a processor. The processor is configured to after being coupled to a memory and reading instructions in the memory, perform, according to the instructions, the method according to any one of the foregoing aspects. The communications apparatus may be the capability exposure network element in the first aspect, or an apparatus including the capability exposure network element. Alternatively, the communications apparatus may be the session management network element in the second aspect, or an apparatus including the session management network element.

According to a sixth aspect, a computer-readable storage medium is provided. The computer-readable storage medium stores instructions, and when the instructions are run on a computer, the computer is enabled to perform the method according to any one of the foregoing aspects.

According to a seventh aspect, a computer program product including instructions is provided. When the computer program product is run on a computer, the computer is enabled to perform the method according to any one of the foregoing aspects.

According to an eighth aspect, a communications apparatus (for example, the communications apparatus may be a chip or a chip system) is provided. The communications apparatus includes a processor, configured to implement the function in any one of the foregoing aspects. In a possible design, the communications apparatus further includes a memory, and the memory is configured to store necessary program instructions and data. When the communications apparatus is a chip system, the communications apparatus may include a chip, or may include a chip and another discrete component.

For technical effects brought by any one of the designs of the third aspect to the eighth aspect, refer to technical effects brought by different designs of the first aspect or the second aspect. Details are not described herein again.

According to a ninth aspect, a service processing system is provided, where the communications system includes a capability exposure network element and a first service management device. The capability exposure network element is configured to receive a first message from an application function network element, where the first message carries a terminal identifier and first network information of a first virtual network, the first network information includes a first virtual network identifier, and the first message is used to request to add a terminal corresponding to the terminal identifier to the first virtual network corresponding to the first virtual network identifier, determine, based on the first network information, a first service management device serving the first virtual network, and send a second message to the first service management device, where the second message carries the terminal identifier and the first network information, and the second message is used to request to add the terminal to the first virtual network such that a correspondence between the terminal identifier and the first network information is stored. The first service management device is configured to receive the second message.

Optionally, the capability exposure network element may be the capability exposure network element described in the first aspect.

According to a tenth aspect, another service processing system is provided, including a session management network element and a first service management device. The session management network element is configured to receive a session setup request message from a terminal, where the session setup request message carries a terminal identifier of the terminal, obtain a first virtual network identifier of a first virtual network on which the terminal is located from a subscriber data management device, determine, based on the first virtual network identifier, a first service management device serving the first virtual network, and send a notification message to the first service management device, where the notification message carries the terminal identifier and the first virtual network identifier and is used to notify the first service management device that the terminal joins the first virtual network. The first service management device is configured to receive the notification message.

Optionally, the session management network element may be the session management network element described in the second aspect.

These aspects or other aspects of this application are clearer and more comprehensible in descriptions of the following embodiments.

DESCRIPTION OF EMBODIMENTS

The following describes technical solutions in embodiments of this application with reference to the accompanying drawings in embodiments of this application. In descriptions of this application, unless otherwise specified, "/" represents an "or" relationship between associated objects. For example, A/B may represent A or B. In this application, "and/or" describes only an association relationship between associated objects and represents that three relationships may exist. For example, A and/or B may represent the following three cases: Only A exists, both A and B exist, and only B exists, where A or B may be singular or plural. In addition, in the descriptions of this application, "a plurality of" means two or more than two unless otherwise specified. "At least one of the following items (pieces)" or a similar expression thereof means any combination of these items, including any combination of singular items (pieces) or plural items (pieces). For example, at least one of a, b, or c may indicate: a, b, c, a and b, a and c, b and c, or a, b, and c, where a, b, and c may be singular or plural. In addition, to clearly describe the technical solutions in embodiments of this application, words such as "first" and "second" are used in embodiments of this application to distinguish between same items or similar items that have basically the same functions or purposes. A person skilled in the art may understand that the terms such as "first" and "second" do not limit a quantity or an execution sequence, and the terms such as "first" and "second" do not indicate a definite difference. In addition, in embodiments of this application, the word such as "example" or "for example" is used to represent giving an example, an illustration, or a description. Any embodiment or design scheme described as an "example" or "for example" in embodiments in this application should not be explained as being more preferable or having more advantages than another embodiment or design scheme.

Exactly, use of the word such as "example" or "for example" is intended to present a relative concept in a specific manner for ease of understanding.

In addition, network architectures and service scenarios described in embodiments of this application are intended to describe the technical solutions in embodiments of this application more clearly, and do not constitute any limitation on the technical solutions provided in embodiments of this application. A person of ordinary skill in the art may learn that with evolution of the network architectures and emergence of new service scenarios, the technical solutions provided in embodiments of this application are also applicable to resolving similar technical problems.

Figure 1:
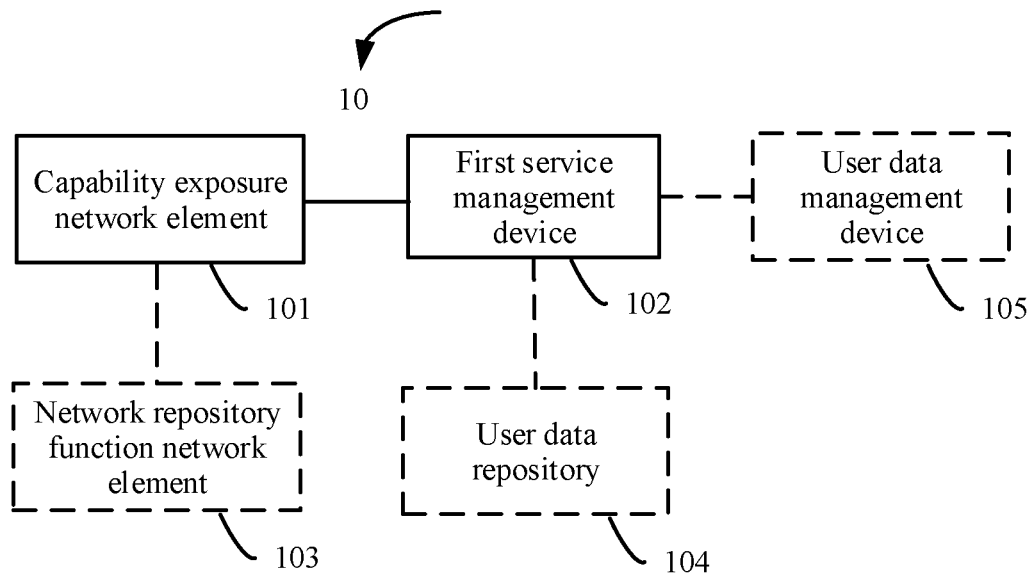
FIG. 1 is a schematic diagram of a possible system network according to an embodiment of the present disclosure.

As shown in FIG. 1, an embodiment of this application provides a service processing system 10. The system 10 includes a capability exposure network element 101 and a first service management device 102. The capability exposure network element 101 and the first service management device 102 may directly communicate with each other, or may communicate with each other through forwarding by another device. This is not specifically limited in this embodiment of this application.

In further implementation, the first service management device 102 may exist independently, or may be integrated into another network element. For example, the first service management device 102 may be integrated into a session management network element, a user data repository 104, or a subscriber data management device 105. This is not limited in this application.

In a possible implementation, the capability exposure network element 101 is configured to receive a first message from an application function network element, where the first message carries a terminal identifier and first network information of a first virtual network, the first network information includes a first virtual network identifier, and the first message is used to request to add a terminal corresponding to the terminal identifier to a first virtual network corresponding to the first virtual network identifier. The capability exposure network element 101 is configured to determine, based on the first network information, a first service management device 102 serving the first virtual network. The capability exposure network element 101 is configured to send a second message to the first service management device 102, where the second message carries the terminal identifier and the first network information, and the second message is used to request to add the terminal to the first virtual network such that a correspondence between the terminal identifier and the first network information is stored. The first service management device 102 is configured to receive the second message. According to this disclosure, in a network with a plurality of service management devices, the capability exposure network element 101 can also address the first service management device serving the terminal, to add the terminal to the virtual network.

The first virtual network identifier may also be referred to as a first virtual network group identifier. A virtual network may also be referred to as a virtual network group, a virtual group, or the like, and a name is not limited herein.

In another possible implementation, the system 10 further includes a network repository function network element 103. The capability exposure network element 101 is configured to send the first network information to the network repository function network element 103. The network repository function network element 103 is configured to send, based on a stored correspondence between the first network information and an identifier of the first service management device, the identification information of the first service management device corresponding to the first network information to the capability exposure network element 101. In this way, the capability exposure network element 101 addresses the first service management device serving the terminal.

In another possible implementation, the first virtual network identifier includes identification information of the first service management device, and the capability exposure network element 101 obtains the identification information of the first service management device from the first virtual network identifier. According to this disclosure, the capability exposure network element 101 can address the first service management device serving the terminal. In this implementation, when allocating the first virtual network identifier, the first service management device 102 also embeds an identifier of the first service management device into the first virtual network identifier. In this way, the first virtual network identifier includes the identifier of the first service management device. In further implementation, the first virtual network identifier may be allocated according to a specific encoding rule. Then, the encoding rule is preconfigured in the capability exposure network element 101, or is sent by the first service management device 102 to the capability exposure network element 101. Then, the capability exposure network element 101 obtains the identifier of the first service management device from the first virtual network identifier according to the encoding rule.

There is a plurality of encoding methods for the encoding rule. For example, the first eight bytes of the first virtual network identifier are defined as the device identifier of the first service management device. A third party obtains the device identifier of the first service management device from the first virtual network identifier, and finds the service management device based on the device identifier of the first service management device. The device identifier herein may be an IP address or a fully qualified domain name (FQDN). This is not limited herein.

In another possible implementation, the system 10 further includes a user data repository 104. The first service management device 102 is configured to send the first network information and the terminal identifier to the user data repository 104. The user data repository 104 is configured to store the correspondence between the first network information and the terminal identifier.

In further implementation, if the first service management device 102 and the user data repository 104 are integrated, or co-deployed, the first service management device 102 stores the correspondence between the first network information and the terminal identifier.

In another possible implementation, the system 10 further includes a subscriber data management device 105. The first service management device 102 is configured to send, to a subscriber data management device 105, a third message used to modify subscription, where the third message carries the terminal identifier and the first virtual network identifier. The subscriber data management device 105 is configured to add the first virtual network identifier to subscription data of the terminal corresponding to the terminal identifier.

In further implementation, if the first service management device 102 and the subscriber data management device 105 are integrated (or co-deployed), the first service management device 102 does not need to send the third message. Instead, the first service management device 102 adds the first virtual network identifier to the subscription data of the terminal corresponding to the terminal identifier.

Figure 2:
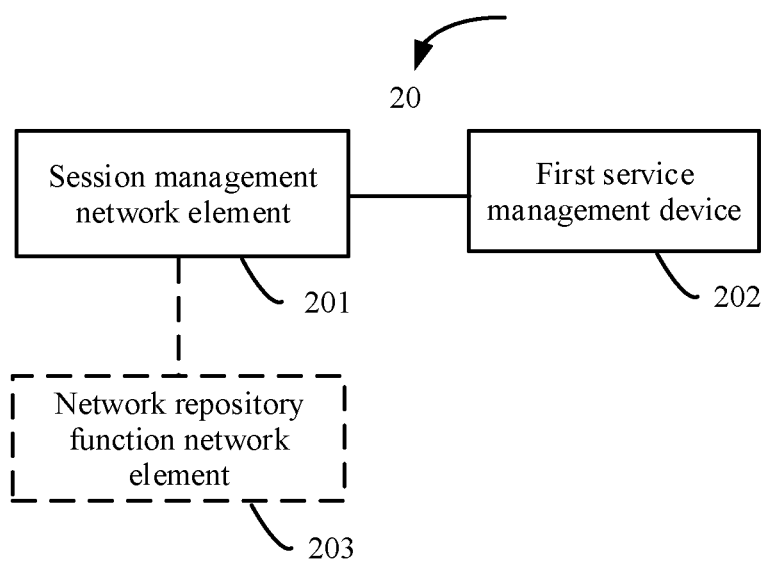
FIG. 2 is a schematic diagram of another possible system network according to an embodiment of the present disclosure.

As shown in FIG. 2, an embodiment of this application provides another service processing system 20. The system 20 includes a session management network element 201 and a first service management device 202. The session management network element 201 and the first service management device 202 may directly communicate with each other, or may communicate with each other through forwarding by another device. This is not specifically limited in this embodiment of this application.

In a possible implementation, the session management network element 201 is configured to receive a session setup request message from a terminal, where the session setup request message carries a terminal identifier of the terminal. The session management network element 201 is configured to obtain a first virtual network identifier of a first virtual network on which the terminal is located from a subscriber data management device, determine, based on the first virtual network identifier, the first service management device serving the first virtual network, and send a notification message to the first service management device 202, where the notification message carries the terminal identifier and the first virtual network identifier and is used to notify the first service management device that the terminal joins the first virtual network. According to this disclosure, in a network with a plurality of GSMFs, the session management network element 201 can also address the first service management device serving the terminal, to notify the first service management device 202 that the terminal is online.

In another possible implementation, the system 20 further includes a network repository function network element 203. The session management network element 201 is configured to send first network information of the first virtual network to the network repository function network element 203, where the first network information includes a first virtual network identifier. The network repository function network element 103 is configured to send, based on a stored correspondence between the first network information and an identifier of the first service management device, the identification information of the first service management device corresponding to the first network information to the session management network element 201. In this way, the session management network element 201 addresses the first service management device 202 serving the terminal.

In another possible implementation, the first virtual network identifier includes identification information of the first service management device, and the session management network element 201 is configured to obtain the identification information of the first service management device from the first virtual network identifier. According to this disclosure, the session management network element 201 can address the first service management device serving the terminal. For an encoding rule for allocating the first virtual network identifier, refer to the descriptions in FIG. 1.

In further implementation, in this embodiment of this application, in addition to the first virtual network identifier, the first network information may further include a first data network name (DNN) and first single-network slice selection assistance information (S-NSSAI).

A further implementation of the foregoing solution is described in detail in following method embodiments. Details are not described herein again.

Figure 3:
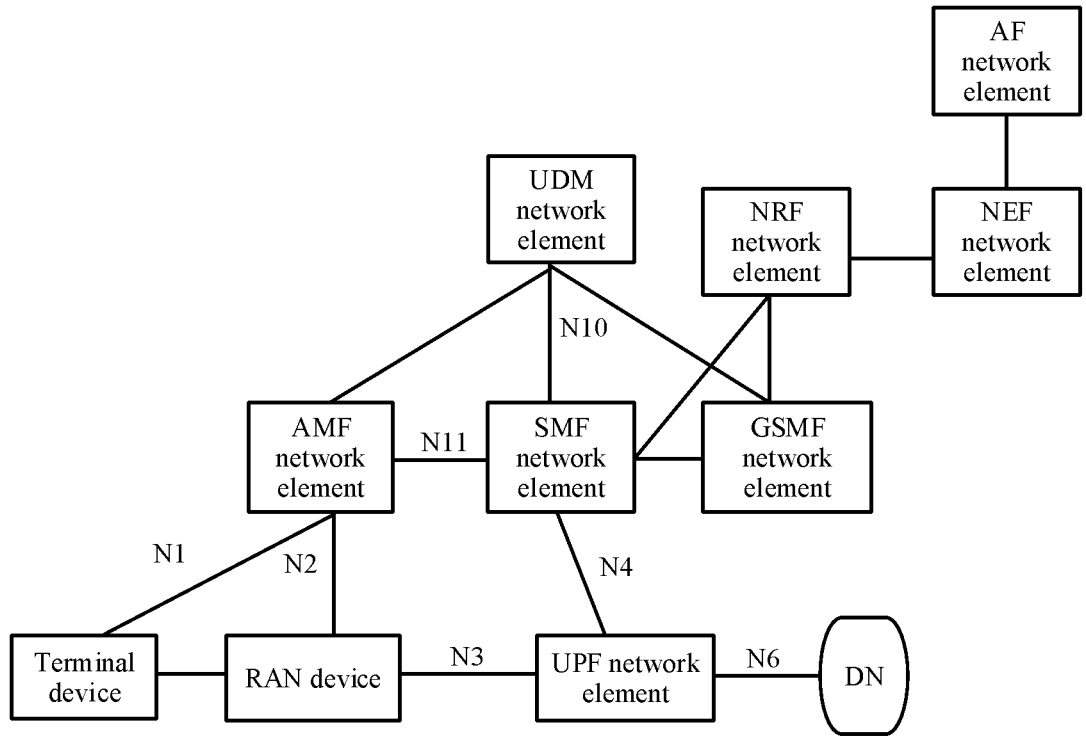
FIG. 3 is a schematic diagram of still another possible system network according to an embodiment of the present disclosure.

The systems shown in FIG. 1 and FIG. 2 may be used in the 5G network architecture shown in FIG. 3, and certainly may also be used in a future network architecture, for example, a sixth generation (6G) network architecture. This is not limited in this application.

The following uses the 5G network architecture shown in FIG. 3 as an example for description. The capability exposure network element 101 corresponds to a network exposure function (NEF) network element in 5G, the network repository function network element 103 corresponds to a network repository function (NRF) network element in 5G, the user data repository 104 corresponds to a unified data repository (UDR) network element in 5G, the session management network element corresponds to a SMF network element in 5G, the subscriber data management device corresponds to a unified data manager (UDM) network element in 5G, and the application function network element corresponds to an application function (AF) network element in 5G.

As shown in FIG. 3, the 5G network architecture may further include UPF network element. This is not specifically limited in this embodiment of this application.

A terminal device communicates with the AMF network element over a next generation N1 interface (N1). A radio access network (RAN) device communicates with the AMF network element over an N2 interface (N2). The RAN device communicates with the UPF network element over an N3 interface (N3). The UPF network element communicates with the DN over an N6 interface (N6). The AMF network element communicates with the SMF network element over an N11 interface (N11). The AMF network element communicates with the UDM network element over an N8 interface (N8). The SMF network element communicates with the UPF network element over an N4 interface (N4). The SMF network element communicates with the UDM network element over an N10 interface (N10). The UPF network element communicates with the UPF network element over an N9 interface (N9).

Figure 4:
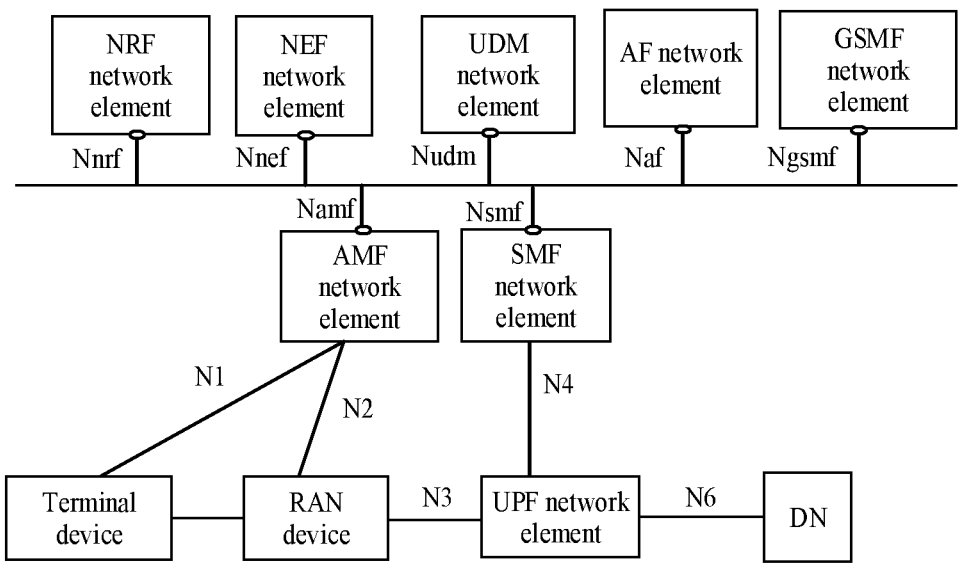
FIG. 4 is a schematic diagram of yet another possible system network according to an embodiment of the present disclosure.

In addition, it should be noted that network elements such as the AMF network element, the NRF network element, the NEF network element, the AF network element, the SMF network element, and the UDM network element in the 5G network architecture shown in FIG. 4 may alternatively interact with each other over service-oriented interfaces. For example, as shown in FIG. 4, an external service-oriented interface provided by the AMF network element may be an Namf interface, an external service-oriented interface provided by the NRF network element may be an Nnrf interface, an external service-oriented interface provided by the NEF network element may be an Nnef interface, an external service-oriented interface provided by the AF network element may be an Naf interface, an external service-oriented interface provided by the SMF network element may be an Nsmf interface, and an external service-oriented interface provided by the UDM network element may be an Nudm interface. For related descriptions, refer to a 5G system architecture in the standard 23.501. Details are not described herein.

The service management device corresponds to a GSMF network element in 5G. The GSMF network element may also be referred to as a 5GVN controller, and a name is not limited. In this application, the GSMF network element is used as an example for description. The GSMF may be independently deployed, or may be integrated or co-deployed in the UDR network element, the UDM network element, or the SMF network element, but is not limited to these network elements. In FIG. 3 and FIG. 4, an example in which the GSMF network element is independently deployed is used, and another scenario is not shown. In FIG. 4, an example in which an external service-based interface provided by the GSMF network element is Ngsmf is used. The interface may have another name subsequently. This is not limited herein.

In 5G, the virtual network identifier may be an identifier used to indicate a 5GVN, which is referred to as a 5GVN identity (ID) for short, or may be referred to as a 5G identifier. A 5GVN ID can be used to identify a 5GVN.

The GSMF network element is responsible for globally managing information on the 5GVN, including an SMF in which each member (that is, each terminal device in the network) is located, and/or is responsible for globally managing routing information of each member in the 5GVN, for example, information about a UPF in which each member is located. The UDR network element is used to store 5GVN configuration information, such as 5GVN member information. The UDR network element can also store 5GVN content defined by a third party over the NEF network element. The GSMF network element may invoke the 5GVN content stored in the UDR network element.

When the GSMF network element and the UDR network element are co-deployed, the UDR network element stores the routing information of each member in the 5GVN, and the GSMF network element is responsible for external interaction. The NEF network element is open to third parties to define the 5GVN and add or delete a member in the 5GVN. The UDM network element is configured to subscribe the 5GVN identifier of the members.

In actual networking, a carrier can deploy a plurality of 5GVN networks. A 5GVN network is also referred to as a 5GVN instance. One GSMF network element can manage or serve two or more 5GVN instances. A 5GVN instance is served by one GSMF network element.

A 5GVN instance may have one SMF network element or instance. The SMF network element manages one or more UPF network elements, and configures forwarding rules on the UPF network elements. One-to-one communication between UE 1 and UE 2 is used as an example. If both the UE 1 and the UE 2 are served by a same UPF network element, for example, a UPF1 network element, transmission is performed by using local switch of the UPF. One-to-one communication between the UE 2 and UE 3 is used as an example. If the UE 2 and the UE 3 are served by different UPF network elements, for example, the UE 2 is served by the UPF1 network element, and the UE 3 is served by a UPF2 network element, transmission between the UE 1 and the UE 3 needs to be performed over a tunnel between the UPF1 network element and the UPF2 network element. However, a service area of the SMF network element is limited. If a 5GVN has a large coverage, for example, a company has branches in Beijing and Shenzhen, and both branches belong to the 5GVN. The Beijing branch is managed by an SMF1 network element, and the Shenzhen branch is managed by an SMF2 network element. To simplify processing on the control plane, the SMF1 network element and the SMF2 network element can be managed by one GSMF network element. One SMF network element may also be served by a plurality of GSMF network elements.

In further implementation, the terminal device in embodiments of this application may be a device configured to implement a wireless communication function, for example, a terminal or a chip applicable in the terminal. The terminal may be user equipment (UE), an access terminal, a terminal unit, a terminal station, a mobile station, a remote station, a remote terminal, a mobile device, a wireless communications device, a terminal agent, a terminal apparatus, or the like in a 5G network or a future evolved PLMN. The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, an in-vehicle device, a wearable device, a virtual reality (VR) terminal device, an augmented reality (AR) terminal device, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, or the like. The terminal may be mobile or at a fixed location.

In further implementation, a related function of the capability exposure network element, the service management device, or the session management network element in embodiments of this application may be implemented by one device, or may be jointly implemented by a plurality of devices, or may be implemented by one or more functional modules in one device. This is not specifically limited in embodiments of this application. It may be understood that the foregoing function may be a network element in a hardware device, a software function running on dedicated hardware, a combination of hardware and software, or a virtualization function instantiated on a platform (for example, a cloud platform).

Figure 5:
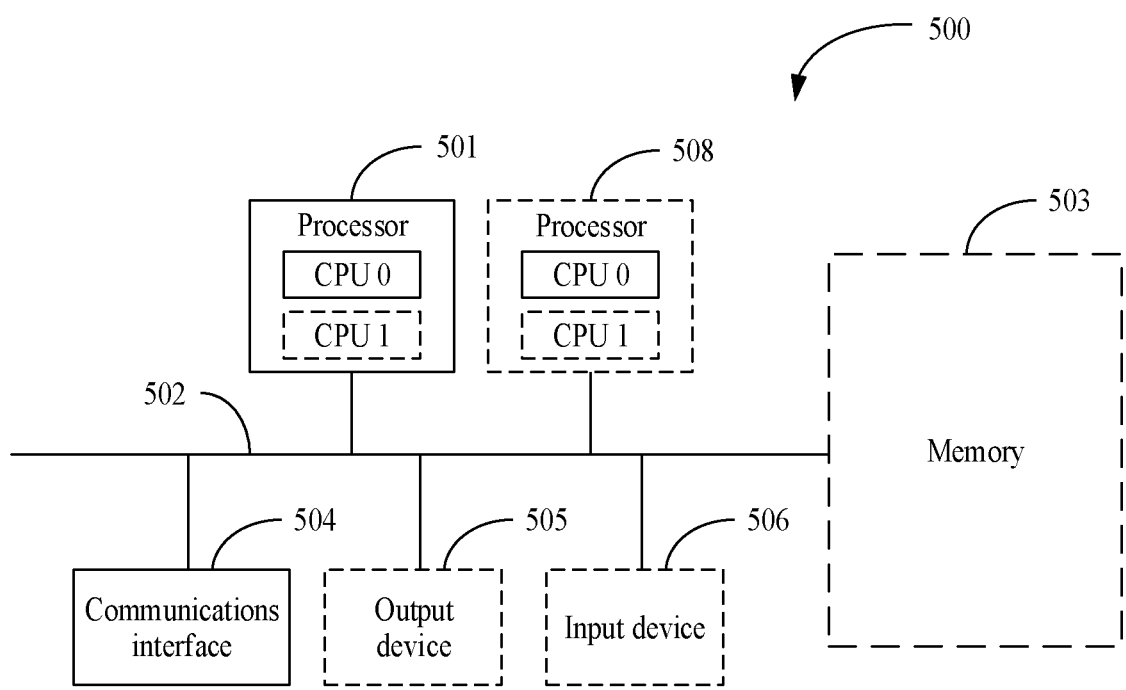
FIG. 5 is a schematic diagram of a computer device according to an embodiment of the present disclosure.

For example, a related function of the capability exposure network element, the service management device, or the session management network element in embodiments of this application may be implemented by a communications device 500 in FIG. 5. FIG. 5 is a schematic diagram of a structure of the communications device 500 according to an embodiment of this application. The communications device 500 includes one or more processors 501, a communications line 502, and at least one communications interface (FIG. 5 uses only an example in which a communications interface 504 and one processor 501 are included for description). Optionally, the communications device 500 may further include a memory 503.

The processor 501 may be a general central processing unit (CPU), a microprocessor, an application-specific integrated circuit (ASIC), or one or more integrated circuits configured to control program execution of the solutions of this application.

The communications line 502 may include a channel, and is configured to connect different components.

The communications interface 504 may be a transceiver module configured to communicate with another device or a communications network such as the Ethernet, a RAN, or a wireless local area network (WLAN). For example, the transceiver module may be an apparatus such as a transceiver. Optionally, the communications interface 504 may alternatively be a transceiver circuit located inside the processor 501, and is configured to implement signal input and signal output of the processor.

The memory 503 may be an apparatus having a storage function. For example, the memory may be a read-only memory (ROM), another type of static storage device that can store static information and an instruction, a random-access memory (RAM), or another type of dynamic storage device that can store information and an instruction, or may be an electrically erasable programmable ROM (EEPROM), a compact disc ROM (CD-ROM) or another compact disc storage, an optical disc storage (including a compact disc, a laser disc, an optical disc, a digital versatile disc, a Blu-ray disc, or the like), a magnetic storage medium or another magnetic storage device, or any other medium that can be used to carry or store expected program code in a form of an instruction or a data structure and that can be accessed by a computer. However, this is not limited thereto. The memory may exist independently, and connect to the processor over the communications line 502. Alternatively, the memory may be integrated with the processor.

The memory 503 is configured to store computer-executable instructions for executing the solutions in this application, and execution is controlled by the processor 501. The processor 501 is configured to execute the computer-executable instructions stored in the memory 503, to implement the service processing method provided in the embodiments of this application.

Alternatively, optionally, in this embodiment of this application, the processor 501 may perform functions related to processing in the service processing method provided in the following embodiments of this application. The communications interface 504 is responsible for communicating with another device or a communications network. This is not specifically limited in this embodiment of this application.

Optionally, the computer-executable instructions in embodiments of this application may also be referred to as application program code. This is not specifically limited in embodiments of this application.

In further implementation, in an embodiment, the processor 501 may include one or more CPUs, for example, a CPU 0 and a CPU 1 in FIG. 5.

In further implementation, in an embodiment, the communications device 500 may include a plurality of processors, for example, the processor 501 and a processor 508 in FIG. 5. Each of these processors may be a single-core processor or a multi-core processor. The processor herein may include but is not limited to at least one of the following various computing devices that run software: a CPU, a microprocessor, a digital signal processor (DSP), a microcontroller unit (MCU), an artificial intelligence processor, or the like. Each computing device may include one or more cores configured to perform an operation or processing by executing software instructions.

In further implementation, in an embodiment, the communications device 500 may further include an output device 505 and an input device 506. The output device 505 communicates with the processor 501, and may display information in a plurality of manners. For example, the output device 505 may be a liquid-crystal display (LCD), a light-emitting diode (LED) display device, a cathode-ray tube (CRT) display device, or a projector. The input device 506 communicates with the processor 501, and may receive user input in a plurality of manners. For example, the input device 506 may be a mouse, a keyboard, a touchscreen device, or a sensor device.

Sometimes the communications device 500 may also be referred to as a communications apparatus, and may be a general-purpose device or a dedicated device. For example, the communications device 500 may be a desktop computer, a portable computer, a network server, a PDA, a mobile phone, a tablet computer, a wireless terminal device, an embedded device, the foregoing terminal device, the foregoing network device, or a device having a structure similar to a structure shown in FIG. 5. A type of the communications device 500 is not limited in this embodiment of this application.

Names of messages between network elements or names of parameters in messages in the following embodiments of this application are merely examples, and may alternatively be other names during specific implementation. This is not specifically limited in embodiments of this application.

The service processing method provided in embodiments of this application is further described with reference to FIG. 1 to FIG. 5.

Figure 6:
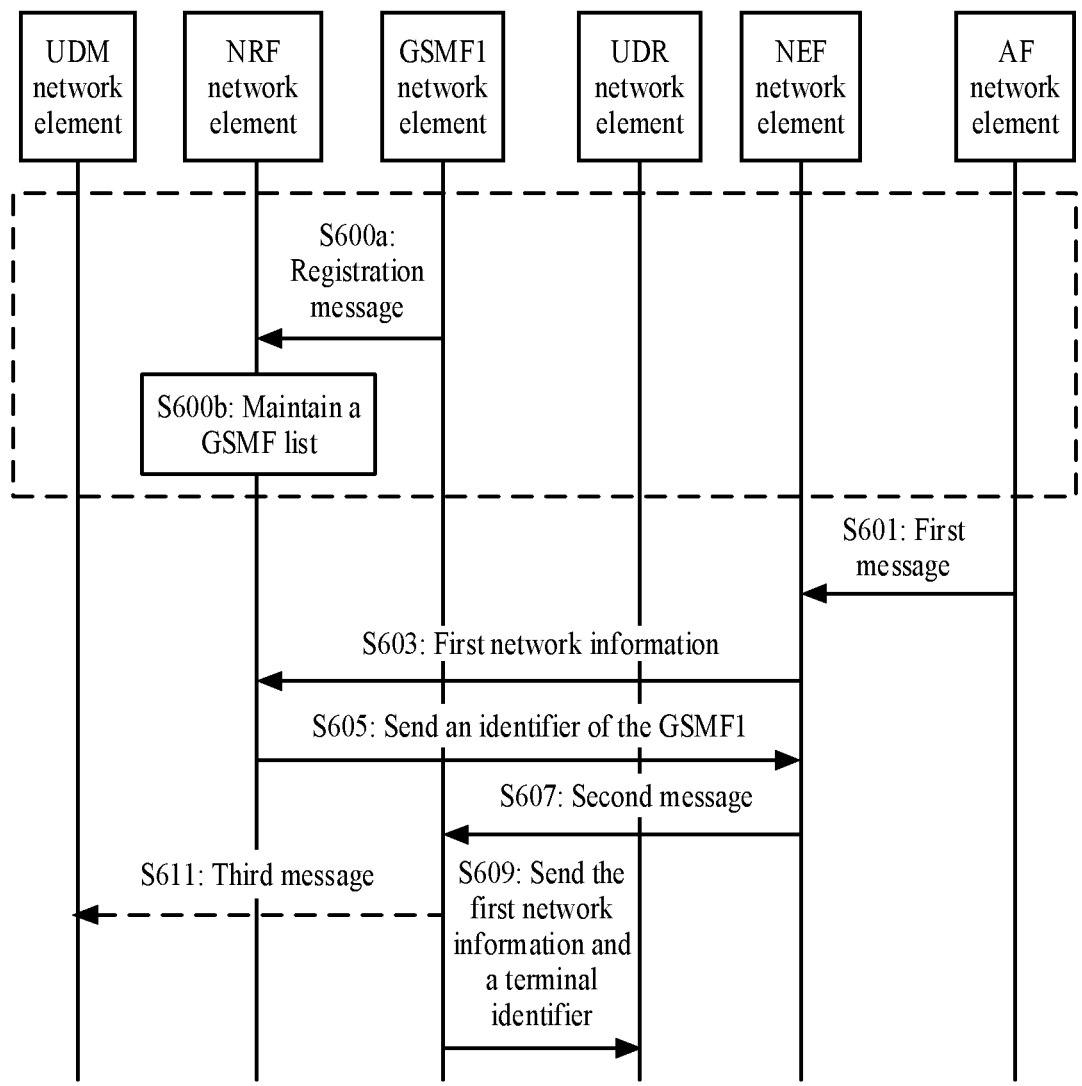
FIG. 6 is a schematic flowchart of a method according to an embodiment of the present disclosure.

FIG. 6 is a schematic flowchart of a service processing method.

Step S601: An AF network element sends a first message to a NEF network element, and the NEF network element receives the first message.

Further, the first message carries a first network identifier of a 5GVN and a terminal identifier. Herein, a generic public subscription identifier (GPSI) of UE is used as an example of the terminal identifier. The first network identifier of the 5GVN may be identified by using a 5GVN ID, or may be identified by using a 5GVN ID, a DNN, and S-NSSAI together.

The first message is used to request to add a terminal UE 1 corresponding to the GPSI to a 5GVN1 (corresponding to the first virtual network) corresponding to the 5GVN ID, that is, add the new member UE 1 to the 5GVN1.

Step S603: The NEF network element sends the first network identifier of the 5GVN to an NRF network element, and the NRF network element receives the 5GVN ID.

Step S605: The NRF network element sends, to the NEF, an identifier that is of a GSMF1, that is stored in the NRF network element, and that corresponds to the first network identifier of the 5GVN, and the NEF network element receives the identifier of the GSMF1.

In this embodiment of this application, an example in which one 5GVN includes one GSMF network element is used. However, in actual implementation, if the 5GVN1 is served by a plurality of GSMF network elements, the NRF network element may return an address set or FQDNs of the plurality of GSMF network elements. If the NRF network element returns a GSMF address set, the NEF selects a GSMF address randomly or based on a specific policy. If the NRF network element returns FQDNs, the NEF network element finds an IP address list from a domain name server (DNS) based on the FQDNs, and the NEF network element finds an address from the IP address list as a target instance of the GSMF.

Step S607: The NEF network element sends a second message to the GSMF1 based on the identifier of the GSMF1, and sends the first network identifier and the terminal identifier that are received in step S601 to the GSMF1 network element. The GSMF1 network element receives the second message. The second message is used to request to add the UE 1 to the 5GVN1.

Step S609: The GSMF1 network element sends the first network identifier and the terminal identifier to a UDR network element, and the UDR network element receives the first network identifier and the terminal identifier.

Optionally, the UDR network element stores a correspondence between the terminal identifier and the first network information such that the correspondence can be used subsequently when the UE 1 performs a service in the 5GVN1 network.

Optionally, if the GSMF1 network element and the UDR network element are co-deployed, step S609 may not be performed, and the GSMF1 stores the correspondence between the terminal identifier and the first network information.

In actual implementation, the method may further include step S611.

Step S611: The GSMF1 network element sends, to a UDM network element, a third message used to modify subscription, where the third message carries the GPSI of the UE 1 and the first virtual network identifier. The UDM network element receives the GPSI of the UE 1 and the first virtual network identifier.

Optionally, the UDM network element adds the first virtual network identifier to subscription data of the UE 1 corresponding to the GPSI.

Steps S609 and S611 are not subject to a specific time sequence. Step S609 may be performed before step S611, or Step S611 may be performed before step S609.

In an implementation, the NRF network element may store a correspondence between the first network identifier of the 5GVN and the identifier of the GSMF by using step S600a and step S600b described below. Another manner may also be used. For example, the foregoing correspondence may be stored on the NRF network element through configuration. This is not limited in this application.

Step S600a: The GSMF1 network element sends a registration message to the NRF network element, and the NRF network element receives the registration message.

To be specific, the registration message carries the identifier of the GSMF1 and network information of at least one virtual network served by the GSMF1. Network information of each of the at least one virtual network includes an identifier of the virtual network. Alternatively, the network information of each of the at least one virtual network includes an identifier of the virtual network, a DNN, and S-NS SAT. The at least one virtual network includes the 5GVN1.

Step S600b: The NRF network element stores a correspondence between the identifier of the GSMF1 and the network information of the at least one virtual network.

Similar to the GSMF1 network element, another GSMF network element may send an identifier of the another GSMF network element and network information of at least one virtual network served by the another GSMF network element to the NRF network element by sending a registration message. The NRF network element maintains a list of these GSMF network elements.

For example, there are four virtual networks: a 5GVN1, a 5GVN2, a 5GVN3, and a 5GVN4. The GSMF1 serves the 5GVN1. A GSMF2 serves the 5GVN2, the 5GVN3, and the 5GVN4. A network identifier of the 5GVN1 is 5GVN1 ID. A network identifier of the 5GVN2 is 5GVN2 ID+DNN1+ S-NSSAI1. Optionally, the network identifier of the 5GVN2 may alternatively be 5GVN2 ID+DNN1+S-NSSAI1+group number. A network identifier of the 5GVN3 is 5GVN3 ID+DNN1+S-NSSAI1. Optionally, the network identifier of the 5GVN2 may alternatively be 5GVN3 ID+DNN1+S-NSSAI1+group number. A network identifier of the 5GVN4 is 5GVN3 ID+DNN2+S-NSSAI2. Optionally, the network identifier of the 5GVN4 may alternatively be 5GVN3 ID+DNN2+S-NSSAI2+group number. In this case, information stored in the NRF is shown in the following Table 1.

TABLE 1

| Identifier of the GSMF1 | 5GVN1 ID | |
|---|---|---|
| Identifier of the GSMF2 | 5GVN2 ID | DNN1 + S-NSSAI1 + group number (optional) |
| | 5GVN3 ID | DNN1 + S-NSSAI1 + group number (optional) |
| | 5GVN4 ID | DNN2 + S-NSSAI2 + group number (optional) |

Based on the service processing method provided in this embodiment, a GSMF network element serving a terminal can be accurately addressed in a network with a plurality of GSMF network elements such that the terminal is added to the virtual network 5GVN1.

Actions of the NEF network element, the GSMF1 network element, or the NRF network element in steps S601 to S611 and steps S600a and S600b may be performed by the processor 501 in the communications device 500 shown in FIG. 5 by invoking the application program code stored in the memory 503. This is not limited in this embodiment.

Figure 7:
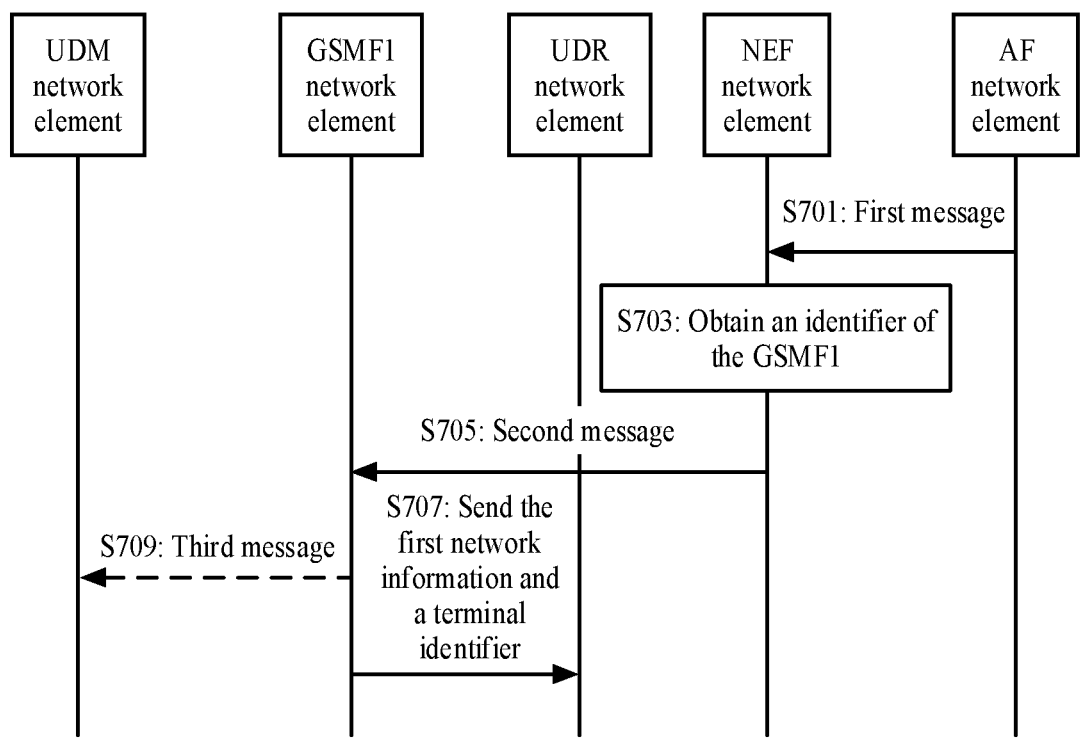
FIG. 7 is a schematic flowchart of another method according to an embodiment of the present disclosure.

FIG. 7 is a schematic flowchart of another service processing method.

Step S701 is the same as step S601.

Step S703: The NEF network element obtains identification information of a GSMF1 from a SGVN ID.

Further, as described in the embodiment shown in FIG. 1, an identifier of the GSMF1 is embedded in the SGVN ID. Therefore, the NEF network element may obtain the identification information of the GSMF1 from the SGVN ID according to an encoding rule.

Steps S705 to S709 are the same as steps S607 to S611.

Based on the service processing method provided in this embodiment, a GSMF serving a terminal can be accurately addressed in a network with a plurality of GSMFs such that the terminal is added to the virtual network 5GVN1.

Actions of the NEF network element or the GSMF1 network element in steps S701 to S709 may be performed by the processor 501 in the communications device 500 shown in FIG. 5 by invoking the application program code stored in the memory 503. This is not limited in this embodiment.

Figure 8:
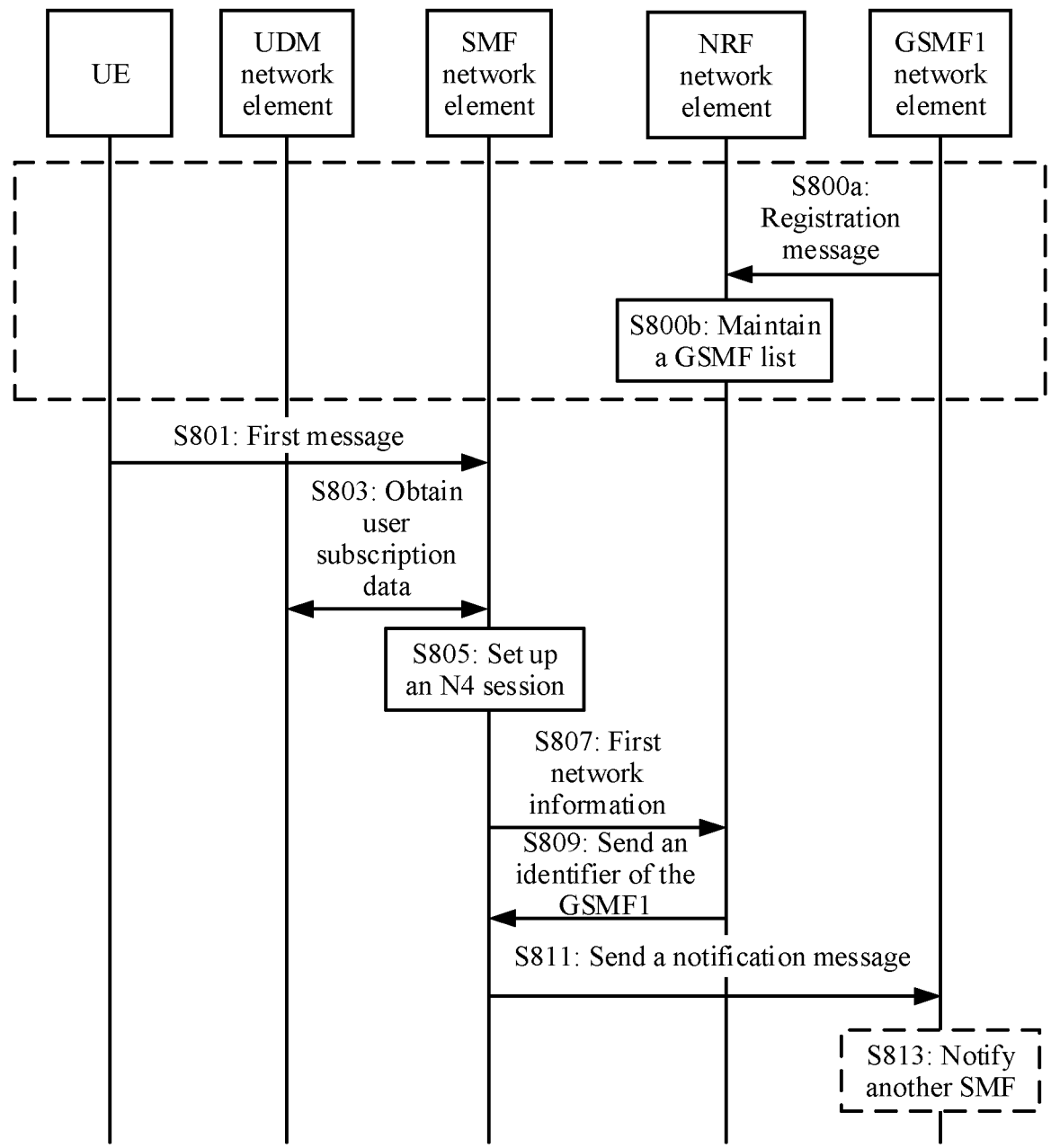
FIG. 8 is a schematic flowchart of still another method according to an embodiment of the present disclosure.

FIG. 8 is a schematic flowchart of still another service processing method.

Step S801: UE sends a first message to an SMF network element. The SMF network element receives the first message.

The first message carries a terminal identifier GPSI, and may further carry a DNN and S-BSSAI. The first message is used to request to set up a protocol data unit (PDU) session.

Step S803: The SMF network element requests subscription data of the terminal from a UDM network element, and the UDM network element sends the subscription data of the terminal to the SMF network element.

The subscription data includes a group identifier of the 5GVN1 on which the terminal is located, that is, a 5GVN ID.

Step S805: The SMF network element controls setup of an N4 session with a UPF network element. For a specific process, refer to a standard process. Details are not described herein again.

Step S807: The SMF network element sends the first network identifier of the 5GVN to an NRF network element, and the NRF network element receives the 5GVN ID.

Step S809: The NRF network element sends, to the SMF network element, an identifier that is of a GSMF1, that is stored in the NRF network element, and that corresponds to the first network identifier of the 5GVN, and the SMF network element receives the identifier of the GSMF1.

Step S811: The SMF network element sends a notification message to the GSMF1 network element, and the GSMF1 network element receives the notification message.

The notification message carries the GPSI and the 5GVN ID, and is used to notify the GSMF1 that a new terminal, that is, the terminal identified by the GPSI, joins the 5GVN1 network. The notification message may further carry routing information of the UPF accessed by the terminal, for example, an interface or an address of the UPF network element.

Optionally, the method may further include step S813. In step S813, the GSMF1 network element sends a notification message to another SMF network element, to notify the another SMF network element that a new terminal joins the 5GVN1 network.

In an implementation, the NRF network element may store a correspondence between the first network identifier of the 5GVN and the identifier of the GSMF by using steps S800a and S800b described below. Another manner may also be used. For example, the foregoing correspondence may be stored on the NRF network element through configuration. This is not limited in this application.

For specific implementation of steps S800a and S800b, refer to steps S600a and S600b.

Based on the service processing method provided in this embodiment, a GSMF network element serving a terminal can be accurately addressed in a network with a plurality of GSMFs, to implement a service that a member gets online.

Actions of the SMF network element or the NRF network element in steps S801 to S813 and steps S800a and S800b may be performed by the processor 501 in the communications device 500 shown in FIG. 5 by invoking the application program code stored in the memory 503. This is not limited in this embodiment.

Figure 9:
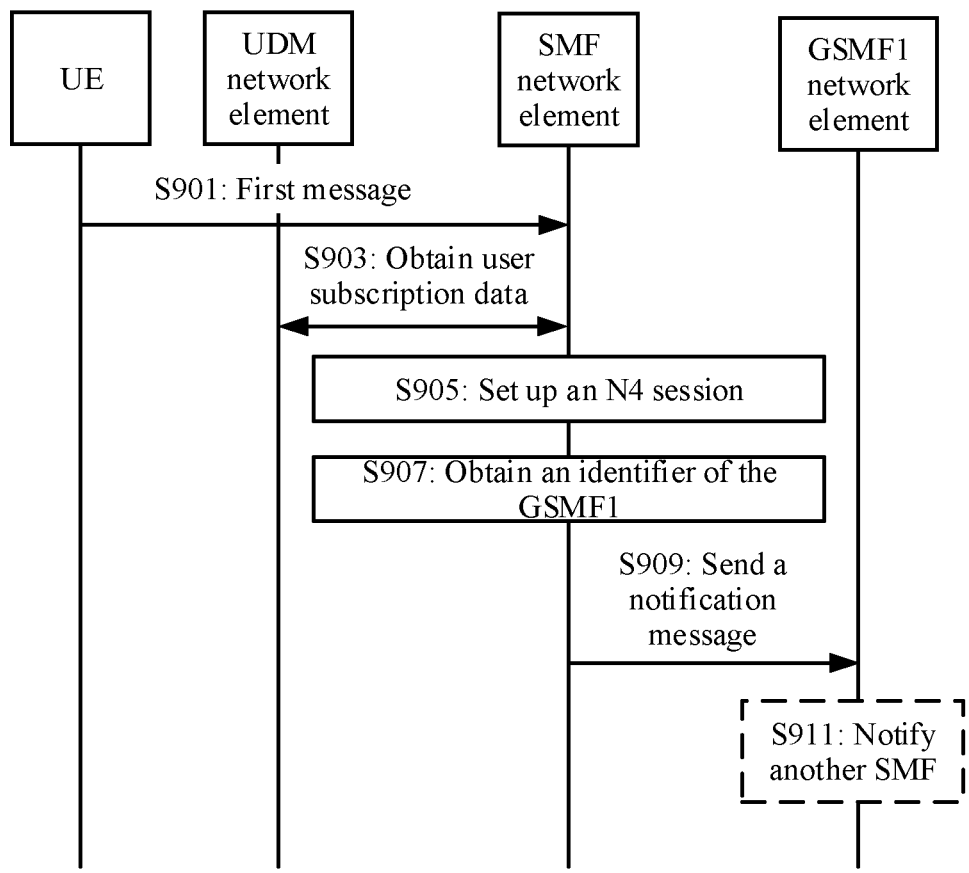
FIG. 9 is a schematic flowchart of yet another method according to an embodiment of the present disclosure.

FIG. 9 is a schematic flowchart of yet another service processing method.

Steps S901 to S905 are the same as steps S801 to S805.

Step S907: The SMF obtains the identification information of the GSMF1 from the 5GVN ID.

To be specific, as described in the embodiment shown in FIG. 1, an identifier of the GSMF1 is embedded in the SGVN ID. Therefore, the SMF may obtain the identification information of the GSMF1 from the 5GVN ID according to an encoding rule.

Steps S909 to S911 are the same as steps S811 to S813.

Based on the service processing method provided in this embodiment, a GSMF network element serving a terminal can be accurately addressed in a network with a plurality of GSMFs, to implement a service that a member gets online.

Actions of the SMF network element in steps S901 to S911 may be performed by the processor 501 in the communications device 500 shown in FIG. 5 by invoking the application program code stored in the memory 503. This is not limited in this embodiment.

In an implementation, based on the embodiment shown in FIG. 6, FIG. 7, FIG. 8, or FIG. 9, a procedure for defining a new SGVN may be further included. The procedure for defining a new SGVN can also exist independently. The following provides a description with reference to FIG. 10.

Step S1001: An AF network element sends a request message to a NEF network element, and the NEF network element receives the request message. The request message is used to add a virtual network 5GVN1 and may be also referred to as a virtual network adding request message. The request message carries a DNN and S-NSSAI information corresponding to the added 5GVN1, and optionally, may further carry a member list.

Step S1003: The NEF network element obtains GSMF information from an NRF network element.

To be specific, after receiving the DNN and the S-NSSAI, the NEF network element cannot learn of, based on the DNN, which GSMF instance serves the 5GVN1. In this case, the NEF network element sends the DNN and the S-NSSAI information to the NRF network element, and the NRF network element receives the DNN and the S-NSSAI information. The NRF network element sends a list of all GSMF instances corresponding to the DNN+the S-NSSAI to the NEF. The GSMF instance list includes a GSMF1. Then, the NEF network element randomly selects the GSMF1 network element from the GSMF instance list, or selects, based on a specific policy, the GSMF1 network element as the GSMF network element serving the 5GVN1.

In further implementation, the NRF network element may alternatively select the GSMF1 from the list of all GSMF instances corresponding to the DNN+the S-NS SAT, and then send identification information of the GSMF1 to the NEF network element.

Step S1005: The NEF network element sends the DNN and the S-NS SAI to the GSMF1 network element, and the GSMF1 network element receives the DNN and the S-NS SAT.

Step S1007: The GSMF1 network element allocates a 5GVN1 ID based on the DNN and the S-NSSAI.

In an implementation, when the GSMF1 allocates the 5GVN1 ID, the identifier of the GSMF1 may be embedded in the 5GVN1 ID such that the GSMF1 can subsequently be found based on the 5GVN1 ID. Optionally, the embedding may be performed according to a specific encoding rule.

Step S1009: The GSMF1 network element sends the 5GVN1 ID to the AF network element through the NEF.

To be specific, the GSMF1 network element sends the 5GVN1 ID to the NEF network element, and the NEF network element sends a response message to the AF network element. After receiving the 5GVN1 ID, the AF subsequently uses the ID for interaction with the same 5GVN.

Optionally, the NEF may forward, to the AF network element, content sent by the GSMF1 network element, may convert the content sent by the GSMF1 network element into a message format and send the converted content to the AF network element, or may send the 5GVN1 ID to the AF network element in the two methods.

In an implementation, the virtual network identifier received by the NEF network element from the GSMF1 network element is different from the virtual network identifier sent to the AF network element, but the two identifiers may both identify a same virtual network. Optionally, the NEF network element may store a correspondence between the two virtual network identifiers. For example, the two virtual network identifiers are an identifier A and an identifier B, and are both used to identify a virtual network 1. The NEF network element receives the identifier A from the GSMF1 network element, and sends the identifier B to the AF. When the AF network element subsequently uses the identifier B to perform a service, the NEF network element receives the identifier B sent by the AF network element, and obtains, based on the stored correspondence between the identifier A and the identifier B, the identifier A corresponding to the identifier B. Then, the NEF network element interacts with the GSMF network element, the NRF network element, or a UDR network element in the network by using the identifier A. In this implementation, in FIG. 6 or FIG. 7, when the 5GVN identifier carried in the message sent by the AF network element to the NEF network element passes through the NEF, the NEF converts the 5GVN identifier into another form of the 5GVN identifier, and then interacts with a network element such as the NRF by using the converted 5GVN identifier. Details are not described herein again.

Figure 10:
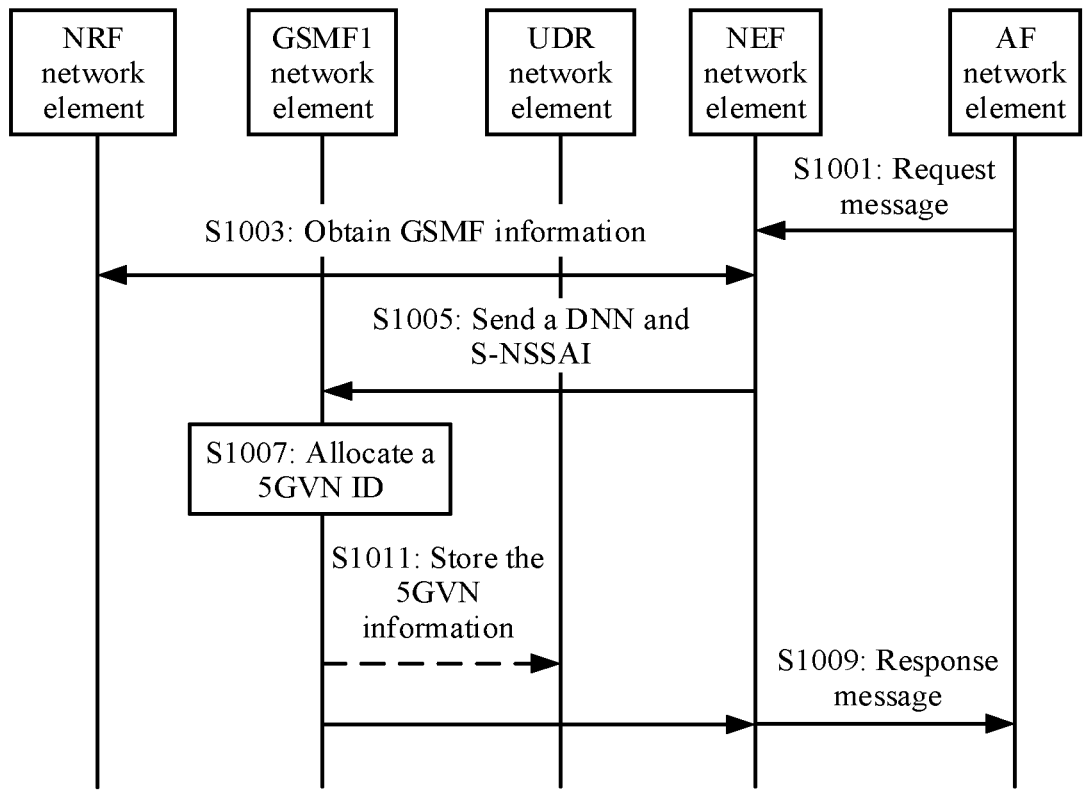
FIG. 10 is a schematic flowchart of yet still another method according to an embodiment of the present disclosure.

Optionally, the embodiment shown in FIG. 10 may further include step S1101: The GSMF1 network element sends the DNN, the S-NSSAI, and the 5GVN1 ID to the UDR network element, and the UDR network element receives the DNN, the S-NSSAI, and the 5GVN1 ID. Optionally, the UDR network element may further store the DNN, the S-NSSAI, and the 5GVN1 ID.

Steps S1009 and S1011 are not subject to a specific sequence. Step S1009 may be performed before step S1011, or step S1011 may be performed before step S1009.

Based on the service processing method provided in this embodiment, a new 5GVN may be defined. The new 5GVN ID is sent to the AF, to subsequently implement communication between terminals in the network by using the 5GVN.

Actions of the NEF network element or the GSMF1 network element in steps S1001 to S1011 may be performed by the processor 501 in the communications device 500 shown in FIG. 5 by invoking the application program code stored in the memory 503. This is not limited in this embodiment.

It may be understood that in the foregoing embodiments, methods and/or steps implemented by the capability exposure network element may also be implemented by a component (for example, a chip or a circuit) that can be used in the capability exposure network element, and methods and/or steps implemented by the session management network element may also be implemented by a component (for example, a chip or a circuit) that can be used in the session management network element.

The foregoing mainly describes the solutions provided in embodiments of this application from a perspective of interaction between network elements. Correspondingly, an embodiment of this application further provides a communications apparatus. The communications apparatus may be the capability exposure network element in the foregoing method embodiment, or an apparatus including the capability exposure network element, or a component that can be used on the capability exposure network element. Alternatively, the communications apparatus may be the session management network element in the foregoing method embodiment, or an apparatus including the session management network element, or a component that can be used on the session management network element. It may be understood that, to implement the foregoing functions, the communications apparatus includes a hardware structure and/or a software module for performing a corresponding function. A person skilled in the art should easily be aware that, in combination with units and algorithm steps of the examples described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 11:
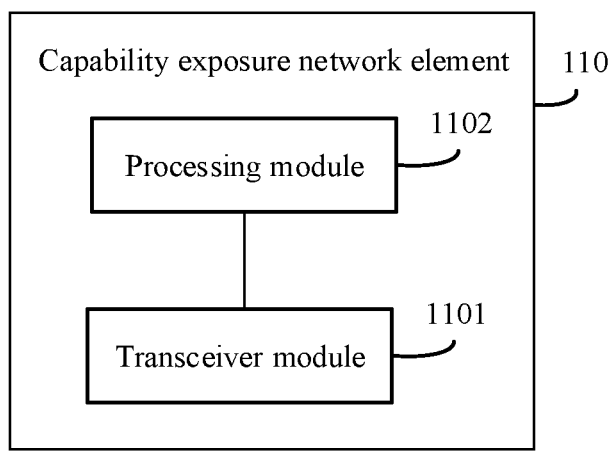
FIG. 11 is a schematic diagram of a structure of an apparatus according to an embodiment of the present disclosure.

For example, the communications apparatus is the capability exposure network element in the foregoing method embodiments. FIG. 11 is a schematic diagram of a structure of a capability exposure network element 110. The capability exposure network element 110 includes a transceiver module 1101 and a processing module 1102. The transceiver module 1101 may also be referred to as a transceiver unit, and is configured to implement a transceiver function. For example, the transceiver module 1101 may be a transceiver circuit, a transceiver, a transceiver, or a communications interface. Details are described below.

The transceiver module 1101 is configured to receive a first message from an application function network element. The first message carries a terminal identifier and first network information of a first virtual network, the first network information includes a first virtual network identifier, and the first message is used to request to add a terminal corresponding to the terminal identifier to a first virtual network corresponding to the first virtual network identifier. The processing module 1102 is configured to determine, based on the first network information, a first service management device serving the first virtual network. The transceiver module 1101 is further configured to send a second message to the first service management device. The second message carries the terminal identifier and the first network information, and the second message is used to request to add the terminal to the first virtual network such that a correspondence between the terminal identifier and the first network information is stored.

In an implementation, the processing module 1102 is specifically configured to send the first network information to a network repository function network element, and receive, from the network repository function network element, identification information that is of the first service management device and that corresponds to the first network information.

In another implementation, the processing module 1102 is further configured to obtain the identification information of the first service management device from the first virtual network identifier. The first virtual network identifier includes the identification information of the first service management device.

In another implementation, the first network information further includes a first data network name and first single-network slice selection assistance information. The transceiver module 1101 is configured to receive a virtual network adding request message from the application function network element, where the virtual network adding request message carries the first data network name and the first single-network slice selection assistance information, send the first data network name and the first single-network slice selection assistance information to a network repository function network element, receive, from the network repository function network element, information about at least one service management device corresponding to the first data network name and the first single-network slice selection assistance information, where the at least one service management device includes the first service management device, send the first data network name and the first single-network slice selection assistance information to the first service management device, receive the first virtual network identifier that is allocated by the first service management device and that corresponds to the first data network name and the first single-network slice selection assistance information, and send a virtual network adding response message that carries the first virtual network identifier to the application function network element.

In this embodiment, the capability exposure network element 110 is presented by dividing the function modules through integration. The "module" herein may be a specific ASIC, a circuit, a processor that executes one or more software or firmware programs, a memory, an integrated logic circuit, and/or another component that can provide the foregoing functions. In a simple embodiment, a person skilled in the art may figure out that the capability exposure network element 110 may be in a form of the communications device 500 shown in FIG. 5.

For example, the processor 501 in the communications device 500 shown in FIG. 5 may invoke the computer-executable instructions stored in the memory 503 such that the communications device 500 performs the service processing method in the foregoing method embodiments.

Further, functions/implementation processes of the transceiver module 1101 and the processing module 1102 in FIG. 11 may be implemented by the processor 501 in the communications device 500 shown in FIG. 5 by invoking the computer-executable instructions stored in the memory 503. Alternatively, a function/an implementation process of the processing module 1002 in FIG. 11 may be implemented by the processor 501 in the communications device 500 shown in FIG. 5 by invoking the computer-executable instructions stored in the memory 503, and a function/an implementation process of the transceiver module 1101 in FIG. 11 may be implemented by using the communications interface 504 in the communications device 500 shown in FIG. 5.

The capability exposure network element 110 provided in this embodiment may perform the foregoing service processing methods. Therefore, for technical effects that can be achieved by the capability exposure network element 110, refer to the foregoing method embodiments. Details are not described herein again.

Figure 12:
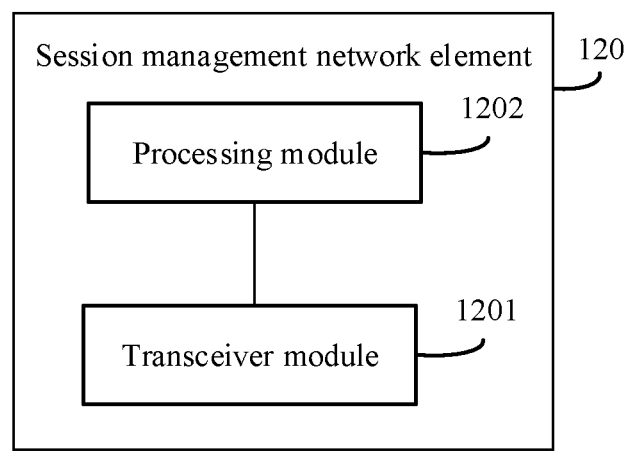
FIG. 12 is a schematic diagram of a structure of another apparatus according to an embodiment of the present disclosure.

Alternatively, for example, the communications apparatus is the session management network element in the foregoing method embodiment. FIG. 12 is a schematic diagram of a structure of a session management network element 120. The session management network element 120 includes a transceiver module 1201 and a processing module 1202. The transceiver module 1201 may also be referred to as a transceiver unit, and is configured to implement a transceiver function. For example, the transceiver module 1201 may be a transceiver circuit, a transceiver, a transceiver, or a communications interface.

In a possible implementation, the transceiver module 1201 is configured to receive a session setup request message from a terminal, where the session setup request message carries a terminal identifier of the terminal, obtain a first virtual network identifier of a first virtual network on which the terminal is located from a subscriber data management device. The processing module 1202 is configured to determine, based on the first virtual network identifier, a first service management device serving the first virtual network. The transceiver module 1201 is configured to send a notification message to the first service management device, where the notification message carries the terminal identifier and the first virtual network identifier and is used to notify the first service management device that the terminal joins the first virtual network.

In another implementation, the processing module 1202 is further configured to send first network information of the first virtual network to a network repository function network element, where the first network information includes the first virtual network identifier, and receive, from the network repository function network element, identification information that is of the first service management device and that corresponds to the first network information.

In another implementation, the first network information further includes the first virtual network identifier, a first data network name, and first single-network slice selection assistance information.

In another implementation, the processing module 1202 is further configured to obtain the identification information of the first service management device from the first virtual network identifier.

In this embodiment, the session management network element 120 is presented by dividing the function modules through integration. The "module" herein may be a specific ASIC, a circuit, a processor that executes one or more software or firmware programs, a memory, an integrated logic circuit, and/or another component that can provide the foregoing functions. In a simple embodiment, a person skilled in the art may figure out that the session management network element 120 may be in a form of the communications device 500 shown in FIG. 5.

For example, the processor 501 in the communications device 500 shown in FIG. 5 may invoke the computer-executable instructions stored in the memory 503 such that the communications device 500 performs the service processing method in the foregoing method embodiments.

Further, functions/implementation processes of the transceiver module 1201 and the processing module 1202 in FIG. 12 may be implemented by the processor 501 in the communications device 500 shown in FIG. 5 by invoking the computer-executable instruction stored in the memory 503. Alternatively, a function/an implementation process of the processing module 1202 in FIG. 12 may be implemented by the processor 501 in the communications device 500 shown in FIG. 5 by invoking the computer-executable instruction stored in the memory 503, and a function/an implementation process of the transceiver module 1201 in FIG. 12 may be implemented by using the communications interface 504 in the communications device 500 shown in FIG. 5.

All related content of the steps in the foregoing method embodiments may be cited in function descriptions of corresponding function modules. Details are not described herein again.

It should be noted that one or more of the foregoing modules or units may be implemented by using software, hardware, or a combination thereof. When any one of the foregoing modules or units is implemented by software, the software exists in a form of a computer program instruction, and is stored in the memory. The processor may be configured to execute the program instruction and implement the foregoing method procedure. The processor may be built into a SoC (system-on-a-chip) or an ASIC, or may be an independent semiconductor chip. The processor includes a core for executing software instructions to perform operations or processing, and may further include a necessary hardware accelerator, for example, a field programmable gate array (FPGA), a PLD (programmable logic device), or a logic circuit that implements a special-purpose logic operation.

When the foregoing modules or units are implemented by using hardware, the hardware may be any one or any combination of a CPU, a microprocessor, a DSP chip, a MCU, an artificial intelligence processor, an ASIC, a SoC, an FPGA, a PLD, a dedicated digital circuit, a hardware accelerator, or a non-integrated discrete device, and the hardware may run necessary software or does not depend on software to perform the foregoing method procedures.

Optionally, an embodiment of this application further provides a communications apparatus (for example, the communications apparatus may be a chip or a chip system). The communications apparatus includes a processor, configured to implement the method according to any one of the foregoing method embodiments. In a possible design, the communications apparatus further includes a memory. The memory is configured to store necessary program instructions and necessary data. The processor may invoke program code stored in the memory, to indicate the communications apparatus to perform the method in any one of the foregoing method embodiments. The memory may not be included in the communications apparatus. When the communications apparatus is a chip system, the communications apparatus may include a chip, or may include a chip and another discrete component. This is not specifically limited in this embodiment of this application.

All or some of the foregoing embodiments may be implemented by using software, hardware, firmware, or any combination thereof. When a software program is used to implement the embodiments, all or a part of the embodiments may be implemented in a form of a computer program product. The computer program product includes one or more computer instructions. When the computer program instructions are loaded and executed on the computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a web site, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive (SSD)), or the like.

Although this application is described with reference to embodiments, in a process of implementing this application that claims protection, a person skilled in the art may understand and implement another variation of the disclosed embodiments by viewing the appended drawings, disclosed content, and the appended claims. In the claims, "comprising" does not exclude another component or another step, and "a" or "one" does not exclude a case of plurality. A single processor or another unit may implement several functions enumerated in the claims. Some measures are recorded in dependent claims that are different from each other, but this does not mean that these measures cannot be combined to produce a better effect.

Although this application is described with reference to specific features and embodiments thereof, it is clear that various modifications and combinations may be made to them without departing from the spirit and scope of this application. Correspondingly, the specification and accompanying drawings are merely example descriptions of this application defined by the appended claims, and are considered as any of or all modifications, variations, combinations or equivalents that cover the scope of this application. It is clear that a person skilled in the art can make various modifications and variations to this application without departing from the spirit and scope of this application. This application is intended to cover the modifications and variations of this application provided that they fall within the scope of the following claims and equivalent technologies of this application.

What is claimed is:

1. A method comprising:
    receiving, by a session management network element from a terminal, a session setup request message comprising a terminal identifier of the terminal;
    obtaining, by the session management network element from a subscriber data management device, a virtual network identifier of a virtual network on which the terminal is located;
    determining, by the session management network element based on the virtual network identifier, a first service management device serving the virtual network by:
        sending, by the session management network element to a network repository function network element, network information of the virtual network, wherein the network information comprises the virtual network identifier; and
        receiving, by the session management network element and from the network repository function network element, identification information that is of the first service management device and that corresponds to the network information; and
    sending, by the session management network element to the first service management device, a notification message comprising the terminal identifier and the virtual network identifier and notifying the first service management device that the terminal joins the virtual network.

2. The method of claim 1, wherein the terminal identifier comprises a generic public subscription identifier (GPSI).

3. The method of claim 1, further comprising:
    receiving, by the network repository function network element, a registration message from the first service management device, wherein the registration message comprises a first identifier of the first service management device and the network information, wherein the network information comprises a second identifier of the virtual network; and
    storing, by the network repository function network element, a correspondence between the identification information and the network information.

4. The method of claim 1, wherein the network information further comprises a data network name and single-network slice selection assistance information.

5. The method of claim 4, further comprising:
    receiving, by a capability exposure network element from an application function network element, a virtual network adding request message comprising the data network name and the single- network slice selection assistance information;
    sending, by the capability exposure network element to the network repository function network element, the data network name and the single-network slice selection assistance information;
    receiving, by the capability exposure network element from the network repository function network element, information about at least one service management device corresponding to the data network name and the single-network slice selection assistance information, wherein the service management device comprises the first service management device;
    sending, by the capability exposure network element to the first service management device, the data network name and the single-network slice selection assistance information;
    receiving, by the capability exposure network element, the virtual network identifier that is allocated by the first service management device and that corresponds to the data network name and the single-network slice selection assistance information; and
    sending, by the capability exposure network element to the application function network element, a virtual network adding response message that carries the virtual network identifier.

6. The method of claim 1, wherein the virtual network identifier comprises identification information of the first service management device, and wherein determining the first service management device comprises obtaining, by the session management network element, the identification information from the virtual network identifier.

7. The method of claim 6, further comprising obtaining the identification information according to an encoding rule.

8. A communications apparatus comprising:
a memory configured to store instructions; and
a processor coupled to the memory and configured to:
receive, from a terminal, a session setup request message carrying a terminal identifier of the terminal;
obtain, from a subscriber data management device, a virtual network identifier of a virtual network on which the terminal is located;
determine, based on the virtual network identifier, a first service management device serving the virtual network, wherein to determine the first service management device, the processor is further configured to:
send, to a network repository function network element, network information of the virtual network, wherein the network information comprises the virtual network identifier; and
receive, from the network repository function network element, identification information that is of the first service management device and that corresponds to the network information; and
send, to the first service management device, a notification comprising the terminal identifier and the virtual network identifier, and notifying the first service management device that the terminal joins the virtual network.

9. The communications apparatus of claim 8, wherein the network information further comprises a data network name and single-network slice selection assistance information.

10. The communications apparatus of claim 8, wherein the virtual network identifier comprises identification information of the first service management device, and wherein the processor is further configured to obtain the identification information from the virtual network identifier.

11. The communications apparatus of claim 10, wherein the processor is further configured to obtain the identification information according to an encoding rule.

12. The communications apparatus of claim 8, wherein the terminal identifier comprises a generic public subscription identifier (GPSI).

13. A service processing system, comprising:
a first service management device configured to receive a notification message;
a session management network element configured to:
receive, from a terminal, a session setup request message, comprising a terminal identifier of the terminal;
obtain, from a subscriber data management device, a virtual network identifier of a virtual network on which the terminal is located;
determine, based on the virtual network identifier, the first service management device serving the virtual network; and
send, to the first service management device, the notification message comprising the terminal identifier and the first virtual network identifier, and notifies the first service management device that the terminal joins the first virtual network; and
a network repository function network element, wherein the session management network element is configured to send network information of the virtual network to the network repository function network element, wherein the network information comprises the virtual network identifier, and
wherein the network repository function network element is configured to send, based on a stored correspondence between the network information and a first identifier of the first service management device, identification information of the first service management device corresponding to the network information to the session management network element.

14. The service processing system of claim 13, wherein the first service management device is further configured to send a registration message to the network repository function network element, wherein the registration message comprises the first identifier and the network information, wherein the network information comprises a second identifier of the virtual network, and wherein the network repository function network element is further configured to:
receive the registration message from the first service management device; and
store a correspondence between the identification information and the network information.

15. The service processing system of claim 13, wherein the network information further comprises a data network name and single-network slice selection assistance information.

16. The service processing system of claim 15, further comprising a capability exposure network element configured to:
receive, from an application function network element, a virtual network adding request message comprising the data network name and the single-network slice selection assistance information; and
send, to the network repository function network element, the data network name and the single-network slice selection assistance information, wherein the network repository function network element is further configured to:
receive the data network name and the single-network slice selection assistance information; and
send, to the capability exposure network element, information about at least one service management device corresponding to the data network name and the single-network slice selection assistance information, wherein the at least one service management device comprises the first service management device,
wherein the capability exposure network element is further configured to:
send the data network name and the single-network slice selection assistance information to the first service management device;
receive, from the first service management device, the virtual network identifier that is allocated by the first service management device and that corresponds to the data network name and the single-network slice selection assistance information; and
send, to the application function network element, a virtual network adding response message that carries the virtual network identifier.

17. The service processing system of claim 13, wherein the session management network element is further configured to obtain identification information of the first service management device from the virtual network identifier.

18. The service processing system of claim 17, wherein the session management network element is further configured to obtain identification information according to an encoding rule.

19. The service processing system of claim 18, wherein the encoding rule is preconfigured.

20. The service processing system of claim 13, wherein the terminal identifier comprises a generic public subscription identifier (GPSI).

* * * * *